US008264498B1

(12) United States Patent
VanDerKamp et al.

(10) Patent No.: US 8,264,498 B1
(45) Date of Patent: Sep. 11, 2012

(54) SYSTEM, APPARATUS, AND METHOD FOR PRESENTING A MONOCHROME IMAGE OF TERRAIN ON A HEAD-UP DISPLAY UNIT

(75) Inventors: Travis S. VanDerKamp, Marion, IA (US); Sarah Barber, Cedar Rapids, IA (US); Terri L. Engels, Cedar Rapids, IA (US); Roger L. Yum, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 854 days.

(21) Appl. No.: 12/080,121

(22) Filed: Apr. 1, 2008

(51) Int. Cl.
*G09G 5/02* (2006.01)
*H04N 7/00* (2011.01)
*G01C 21/00* (2006.01)

(52) U.S. Cl. .................... 345/589; 348/115; 340/980

(58) Field of Classification Search ........... 701/3–18; 345/418, 428–618; 340/945–980; 703/3–18; 348/113–123
See application file for complete search history.

(56) References Cited

U.S. PATENT DOCUMENTS

| 3,911,597 | A * | 10/1975 | Millard et al. ............ 434/43 |
| 6,600,489 | B2 * | 7/2003 | Cook ...................... 345/426 |
| 7,555,372 | B2 * | 6/2009 | Dwyer ...................... 701/16 |
| 2006/0241821 | A1 * | 10/2006 | Hrabak et al. .............. 701/3 |
| 2007/0005199 | A1 * | 1/2007 | He .......................... 701/16 |
| 2007/0171094 | A1 * | 7/2007 | Alter et al. ............... 340/970 |
| 2007/0190502 | A1 * | 8/2007 | Chladny .................... 434/150 |
| 2009/0248297 | A1 | 10/2009 | Feyersisen et al. |

OTHER PUBLICATIONS

Johnston et. al. "Improving Situation Awareness Displays for Air Traffic Controllers", Proceedings of the Seventh International Symposium on Aviation Psychology, 1993, Ohio State University.*
http://en.wikipedia.org/wiki/File:F-15E_LANTIRN_IR_HUD_image.jpg#filehistory, image version, Jan. 2007.*
U.S. Appl. No. 11/811,113, filed Jul. 25, 2007, Wenger et al.
U.S. Appl. No. 12/069,234, filed Feb. 8, 2008, Wichgers et al.
U.S. Appl. No. 12/069,319, filed Feb. 8, 2009, Wichgers.

* cited by examiner

*Primary Examiner* — Xiao M. Wu
*Assistant Examiner* — Yingchun He
(74) *Attorney, Agent, or Firm* — Donna P. Suchy; Daniel M. Barbieri

(57) ABSTRACT

A present novel and non-trivial system, apparatus, and method for presenting a monochrome, three-dimensional image of terrain on a Head-Up Display ("HUD") unit is disclosed. Based upon aircraft navigation and terrain data, an image data set representative of a lighted solid image of terrain comprised of a plurality of intensities of one color may be generated. The image data set may be determined as a function of terrain data and color intensity data, where the color intensity data could be comprised of one or more shading effects, one or more texturing effects, or a combination of both. Based upon the image data set, a three-dimensional perspective of a terrain scene outside the aircraft may be presented to the pilot.

16 Claims, 8 Drawing Sheets

100

110 Navigation System
| 112 Geo. Position |
| 114 Altitude |
| 116 Heading |
| 118 Attitude |

120 Terrain Data Source

122 Terrain Database

124 Aircraft System

130 Location Data Source

132 Location Database

134 Aircraft System

150 Image Generating Processor

140 HUD Unit

SYSTEM, APPARATUS, AND METHOD FOR PRESENTING A MONOCHROME IMAGE OF TERRAIN ON A HEAD-UP DISPLAY UNIT

BACKGROUND OF THE INVENTION

1. Field of the Invention

This invention pertains to the field of cockpit indicators or head-up display units that provide terrain information to the pilot or flight crew of an aircraft.

2. Description of the Related Art

Modern avionics systems employ Head-Up Display ("HUD") and Head-Down Display ("HDD") indicating systems for providing tactical flight information to the pilot. In a HUD system, a HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot. In a HDD system, a tactical flight display is mounted in the cockpit instrument panel directly in front of the pilot and below windshield level. To view the presentation of information on a display unit of a HDD system, a pilot must look down into the cockpit, causing him or her to take his or her eyes from the outside scene of the aircraft.

Modern avionics systems may employ Synthetic Vision Systems ("SVS") for displaying terrain information to both HDD and HUD systems. The SVS system is advantageous in an HDD and HUD indicating system because it presents terrain information of the scene outside the aircraft, thereby enhancing the situational awareness of the pilot. In an HDD system, a lighted solid image of terrain and objects (e.g., obstacles and runways) may be represented on an HDD unit as a realistic, intuitive, three-dimensional perspective using terrain color coding according to elevation that mimics coloring used in aviation-related charts and publications.

In a HUD system, an image of terrain and its features may be rendered as a wireframe that presents a monochrome, three-dimensional perspective on a HUD unit. Testing in a cockpit simulator has demonstrated that a wireframe image tends to be difficult to interpret. Terrain features are not easily distinguishable on the wireframe image as they are on the HDD lighted solid image. Also, multiple terrain resolutions and high resolution data tend to clutter a wireframe image, and objects may be difficult to display in rendering a wireframe terrain image. In addition, a pilot tends to lose perception of the surface as the altitude of the aircraft approaches the elevation of the terrain.

BRIEF SUMMARY OF THE INVENTION

The embodiments disclosed herein present novel and nontrivial system, apparatus, and method for presenting a monochrome, three-dimensional lighted solid image of terrain to the pilot on a HUD unit based upon an image data set comprised of terrain data and color intensity data. The color intensity data may include one or more shading effects, one or more texturing effects, or any suitable combination of both. Simulator testing has demonstrated that the use of shading and texturing effects to depict an image of terrain provides benefits and advantages over the use of a wireframe image. Such effects provide the pilot a sense of motion, distance to terrain, and height above terrain cues to the pilot.

In one embodiment, a system is disclosed for presenting a monochrome image of terrain to the pilot. The system comprises a navigation system for providing aircraft position and orientation data, a data source for providing terrain data, an image generating processor, and a display unit. The image generating processor could generate an image data set representative of a lighted solid terrain image comprised of a plurality of intensities of one color; the image data set may be determined as a function of terrain data and color intensity data. After the image data set has been generated, the image generating processor could provide the image data set to a HUD unit for presenting a three-dimensional perspective of a terrain scene outside the aircraft based upon the image data set. As embodied herein, the image generating processor could be a processor used in an SVS or EVS.

In another embodiment, an apparatus is disclosed for presenting a monochrome image of terrain to the pilot. The apparatus comprises an input communications interface, an image generating processor, and an output communications interface. The input communications interface facilitates the receipt of data from data sources. The image generating processor could generate an image data set representative of a lighted solid terrain image comprised of a plurality of intensities of one color; the image data set may be determined as a function of terrain data and color intensity data. After the image data set has been generated, the image generating processor could provide the image data set to an output communications interface for facilitating the providing of the image data set to a HUD unit. As embodied herein, the image generating processor could be a processor used in an SVS or EVS.

In another embodiment, a method is disclosed for presenting a monochrome image of terrain to the pilot. Navigation data and terrain data could be received. An image data set could be generated, wherein image data set could be representative of a lighted solid terrain image determined as a function of a plurality of intensities of one color; the image data set may be comprised of terrain data and color intensity data. This image data set comprises data representative of a three-dimensional perspective of a terrain scene outside the aircraft based upon the image data set.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 1:
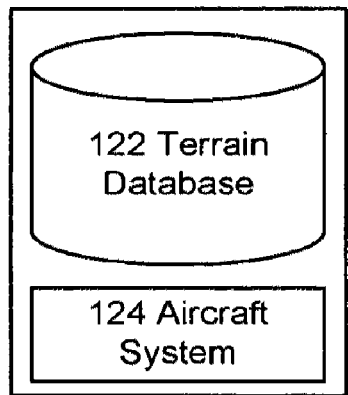
FIG. 1 depicts a block diagram of a system for presenting a monochrome image to the pilot on a HUD unit.
Figure 1:
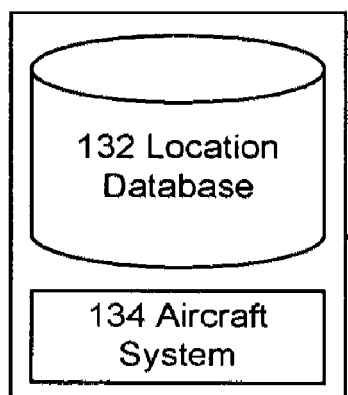

FIG. 1 depicts a terrain presentation system 100 suitable for implementation of the techniques described herein. The system may be comprised of a navigation system 110, a terrain data source 120, a location data source 130, a HUD unit 140, and an image generating ("IG") processor 150.

In the embodiment of FIG. 1, a navigation system 110 comprises the system or systems that could provide navigation data information in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. A navigation system 110 could provide navigation data including, but not limited to, geographic position (e.g., latitude and longitude coordinates) 112, altitude 114, heading 116, and attitude 118. As embodied herein, aircraft position comprises geographic position 112 and altitude 114, and heading may be derived from either geographic position, aircraft position, or both. As embodied herein, aircraft orientation may include pitch, roll, and/or yaw information related to the attitude of the aircraft. As embodied herein, a navigation system 110 could provide navigation data including, but not limited to, geographic position 112, altitude 114, heading 116, and attitude 118 to an IG processor 150 for subsequent processing as discussed herein.

In the embodiment of FIG. 1, a terrain data source 120 could comprise any source of terrain data, obstacle data, or both. As embodied herein, a terrain data source 120 may include, but is not limited to, a terrain database 122 and other aircraft systems 124 which could employ terrain data. A terrain database 122 may be any database used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonal, or circular. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 122 and location data base 132 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle in terrain database 122 could be stored, a temporary runway closure in an airport database, and a temporary flight restriction in airspace database. Any database used in the embodiments disclosed herein may be a stand-alone database or a combination of databases. For example, a terrain database 122 may be associated with a terrain awareness and warning system ("TAWS") only. In an alternative embodiment, terrain data could be stored in or combined with an airport database, airspace database, or with a database used by any other aircraft system 124 and 134 including, but not limited to, a database associated with a flight management computing system and an airspace awareness and warning system ("AAWS"). An example of a TAWS and an AAWS which utilize airport and airspace databases are described in U.S. patent application Ser. No. 12/069,234 and U.S. Pat. No. 7,714,744, respectively, each of which is incorporated by reference in its entirety.

Although other aircraft systems 124 could employ terrain databases 122, such systems could also be a source of terrain data provided to an IG processor 150. For example, a synthetic vision system ("SVS") may employ a terrain database to generate terrain image data. Here, the terrain database that is part of an SVS could be the source of terrain data in system 100. Alternatively, the SVS could provide an IG processor 150 with terrain data in the form of terrain image data. Other examples of other aircraft systems 124 which could comprise sources of terrain data include, but are not limited to, a TAWS and an AAWS. As embodied herein, a terrain database 122 and other aircraft systems 124 could provide terrain data to an IG processor 150 for subsequent processing as discussed herein.

In the embodiment of FIG. 1, a location data source 130 could comprise any source of location data for one or more visible and invisible objects such as but not limited to, obstacles, airports, navigation aids, and airspaces. A location data source 130 may include, but is not limited to, a location database 132 and other aircraft systems 134. Although not depicted in FIG. 1, a location data source could include a terrain data source 120. A location database 132 could include, but is not limited to, an airport database and airspace database that are part of the previously-mentioned TAWS and AAWS. An airport database may be used to store airport-related data including, but not limited to, airport and runway information. Airport information could include surveyed location and elevation data, and runway information could include surveyed location and elevation data of the runway and runway threshold.

An airspace database may be used to store airspace-related data including, but not limited to, information related to regulatory special use airspace area and non-regulatory special use airspace area data. Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions identified by an area within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants.

Airspaces may be designated by as terminal or enroute airspace. As embodied herein, airspaces may include designated reporting points. Generally, an aviation regulatory authority or organization possesses the authority of designating and defining airspace. In the United States, the Federal Aviation Administration ("FAA") establishes and provides the defined dimensions of airspace. For example, the FAA has categorized airspace into five classes, i.e., Class A, Class B, Class C, Class D, and Class E, and reporting points.

Generally, airspaces are depicted on aeronautical charts or discussed in other operational publications which provide aeronautical information. An airspace may be delineated by vertical and/or horizontal dimensions. The vertical dimensions of airspace may be designated by altitude floors and ceilings expressed as flight levels or other appropriate measures such as feet or meters above mean sea level (MSL) or other reference including the surface of the earth. The horizontal dimensions of an airspace may be defined by geographic coordinates (e.g., latitude ("lat.") and longitude ("long.")) or other appropriate references that clearly define their perimeter. An airspace may be in effect for one or more designated time periods or run continuously. Additional information regarding airspaces is disclosed in U.S. Pat. No. 7,714,744.

Although other aircraft systems 134 could employ location databases 132, such systems could also be a source of location data provided to an IG processor 150. For example, other aircraft systems 134 which could comprise sources of location data include, but are not limited to, a flight management system, a TAWS, and an AAWS. As embodied herein, a location database 132 and other aircraft systems 134 could provide location data to an IG processor 150 for subsequent processing as discussed herein.

In the embodiment of FIG. 1, a HUD Unit 140 provides symbology of tactical flight information to the pilot or flight crew, in the pilot's forward field of view through the windshield, eliminating transitions between head-down to head-up flying. A HUD Unit 140 may display the same information found on a primary flight display ("PFD"), such as "basic T" information (i.e., airspeed, attitude, altitude, and heading). Although it provides the same information as that of a PFD, a HUD Unit 140 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A HUD Unit 140 is designed to provide flexible configurations which may be tailored to the desired configuration specified by a buyer or user of the aircraft. In an embodiment of FIG. 1, a three-dimensional, lighted solid terrain image may be presented on a HUD Unit 140 as disclosed herein. In another embodiment of FIG. 1, a three-dimensional terrain image presented on a HUD Unit 140 may be enhanced using location highlighters. An example of a terrain image enhanced using location highlighters is provided in U.S. Pat. No. 8,094,188 entitled "System, Apparatus, and Method for Enhancing the Image Presented on a Display Unit of an Aircraft through Location Highlighters," which is incorporated by reference in its entirety. As embodied herein, a HUD Unit 140 could receive an image data set from an IG processor 150 for subsequent presentation.

In the embodiment of FIG. 1, an IG processor 150 may receive input data from various systems including, but not limited to, a navigation system 110, a terrain data source 120, and a location data source 130. An IG processor 150 may be operatively coupled to these to facilitate the receiving of input data; as embodied herein, operatively coupled may be considered as interchangeable with electronically coupled. An IG processor 150 may also be operatively coupled to a HUD Unit 140 to facilitate the providing of output data. It is not necessary that a direct connection be made; instead, such receiving of input data and providing of output data could be provided through a data bus or through a wireless network.

In the embodiment of FIG. 1, an IG processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An IG processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing unit. As embodied herein, an IG processor 150 could be a processor(s) used by or in conjunction with any other system of the aircraft including, but not limited to, a processor(s) associated with a vision system such as an SVS, an enhanced vision system ("EVS"), a flight management computing system, a TAWS, an AAWS, a HUD unit 142, or any combination thereof.

In the embodiment of FIG. 1, an IG processor 150 may generate or render an image data set for presenting a lighted solid terrain image formed by varying the intensity or brightness of a single color for depicting terrain on a HUD Unit 140. As embodied herein, intensity and brightness are intended to be synonymous. An IG processor 150 could receive terrain data received from a terrain data source 120. The terrain data could be used to form a terrain model from which an IG processor 150 could determine the color intensities from which a monochrome image representative of a three-dimensional perspective of the scene outside the aircraft could be presented on a HUD Unit 140. As embodied herein, if terrain data received from an aircraft is terrain image data for displaying a multi-color image of terrain generated by another system, an IG processor 150 may be programmed to generate an image data set representative of a monochrome, lighted solid terrain image as a function of the terrain data and color intensity data. It should be noted that at any time during the generation of the image data set, an IG processor 150 may apply a scaling component to convert terrain data of "world space" to an image data set of "screen space" representative of the terrain image presented on the face of the screen of a display unit.

A plurality of intensities of a single color may be utilized to generate a three-dimensional perspective of the scene outside the aircraft by implementing the use of shading effects or texturing effects by varying the intensity level of the color, e.g., greater intensity for lighter areas and lesser intensity for darker areas. Shading effects may be determined as a function of one or more factors known to those skilled in the art such as, but not limited to, the type of light source, angle of light source to terrain of the terrain model, distance falloff, and advanced lighting techniques. For example, light sources could fall into one category including, but not limited to, directional light, point light, spotlight, and area light. The angle of the light source could vary with changes in terrain elevation or the rate of change of terrain, i.e., density of terrain contours. An increase or decrease in the elevation of terrain in the scene outside the aircraft might cause the angle of light source (assumed to be located behind the aircraft) to change with respect to the surface of the terrain. For example, an increase of terrain elevation could result with lighter shading and greater intensity of the color being generated due to a decrease of the angle of the light source striking the surface of the terrain; likewise, a decrease of terrain elevation could result with darker shading and lesser intensity of the color being generated because of an increase of the angle striking the surface of the terrain. Distance falloff is a technique where shading becomes darker as the distance from a light source becomes greater; the employment of such technique could produce a more realistic image. Advanced lighting techniques could include those which have been created to produce smooth shading including, but are not limited to, Gouraud shading and Phong shading techniques.

Figure 2A:
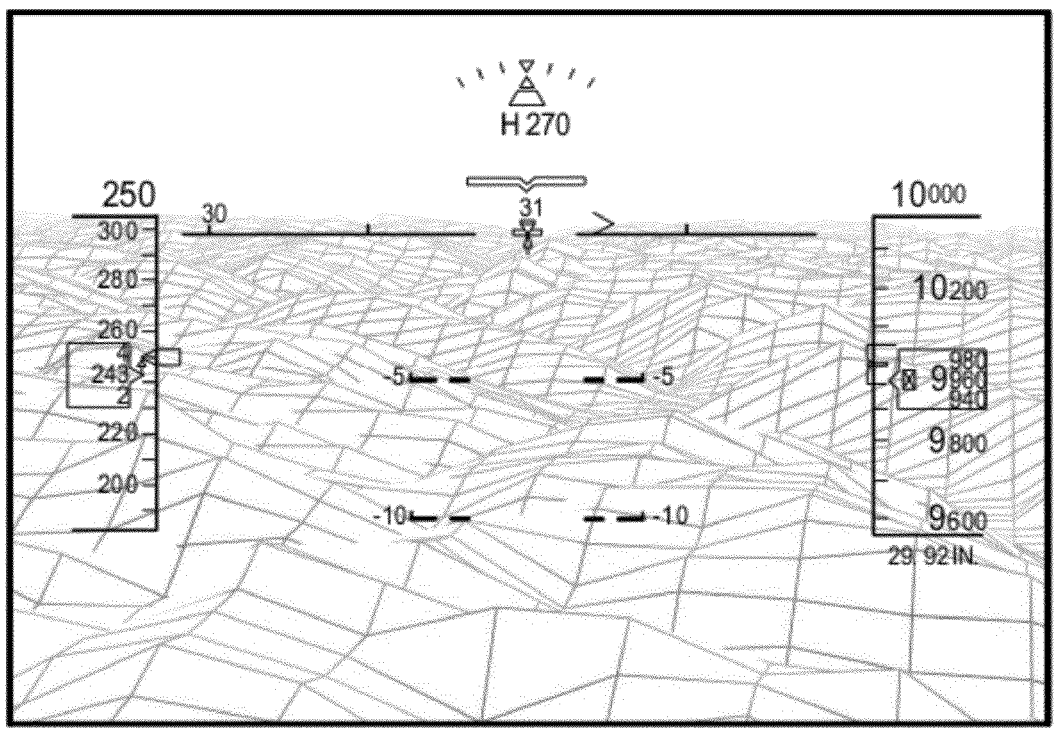
FIGS. 2A and 2B depict examples of presenting a monochrome image of a three-dimensional perspective of terrain presented on a HUD unit as a wireframe.
Figure 2B:
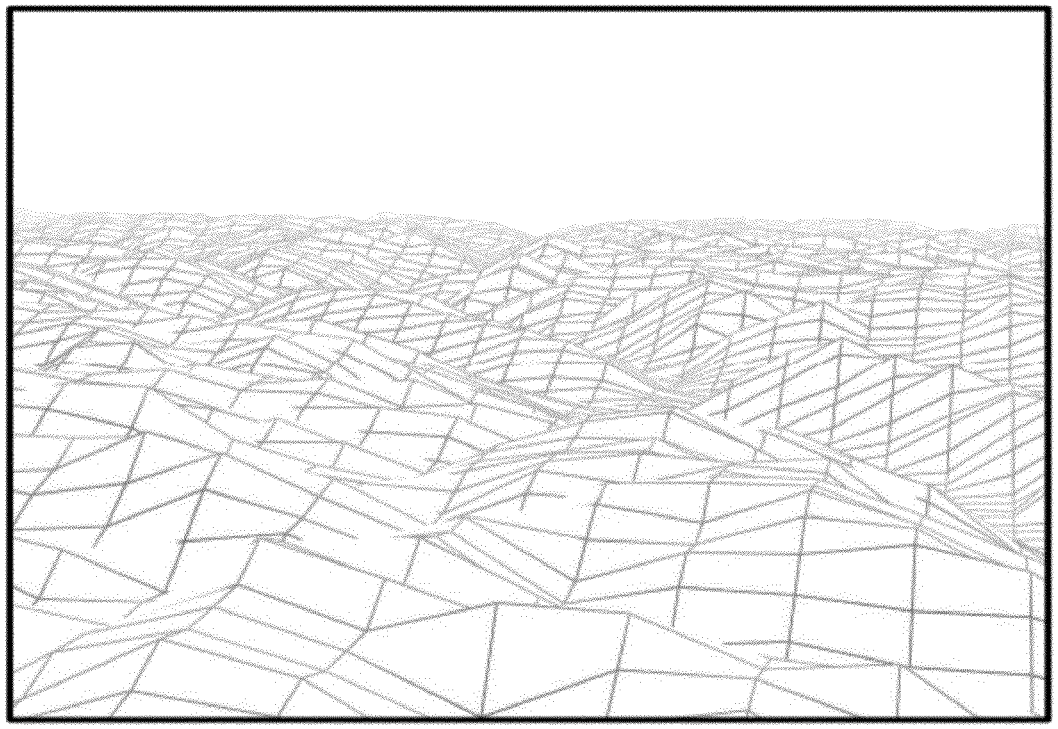

The advantages and benefits of the embodiments discussed herein may be illustrated by showing examples of a lighted solid terrain image formed as a function of one or more intensities of a single color as embodied herein. FIG. 2A provides an example of a depiction of a HUD Unit 140 presenting symbology of tactical flight information to the pilot or flight crew against the backdrop of an image of terrain rendered as a wireframe and presented to the pilot or flight crew as a monochrome, three-dimensional perspective on the display unit. Typically, the color of the wireframe and symbology is green. It should be noted that the symbology depicted on the HUD Unit 140 shown in FIG. 2A has been made minimal intentionally for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein. FIG. 2B provides the same wireframe terrain image presented in FIG. 2A but without the depiction of symbology.

Testing in a cockpit simulator has demonstrated that a wireframe image tends to be difficult to interpret. Terrain features are not as distinguishable on the wireframe image as that of a lighted solid image presented in color on a head-down display unit. Also, multiple terrain resolutions and high resolution data tend to clutter a wireframe image, and objects may be difficult to display in rendering a wireframe terrain image. In addition, a pilot may tend to lose perception of the terrain surface of a wireframe image as the altitude of the aircraft approaches the elevation of the terrain. The advantages and benefits of the embodiments discussed herein may address these deficiencies.

Figure 3:
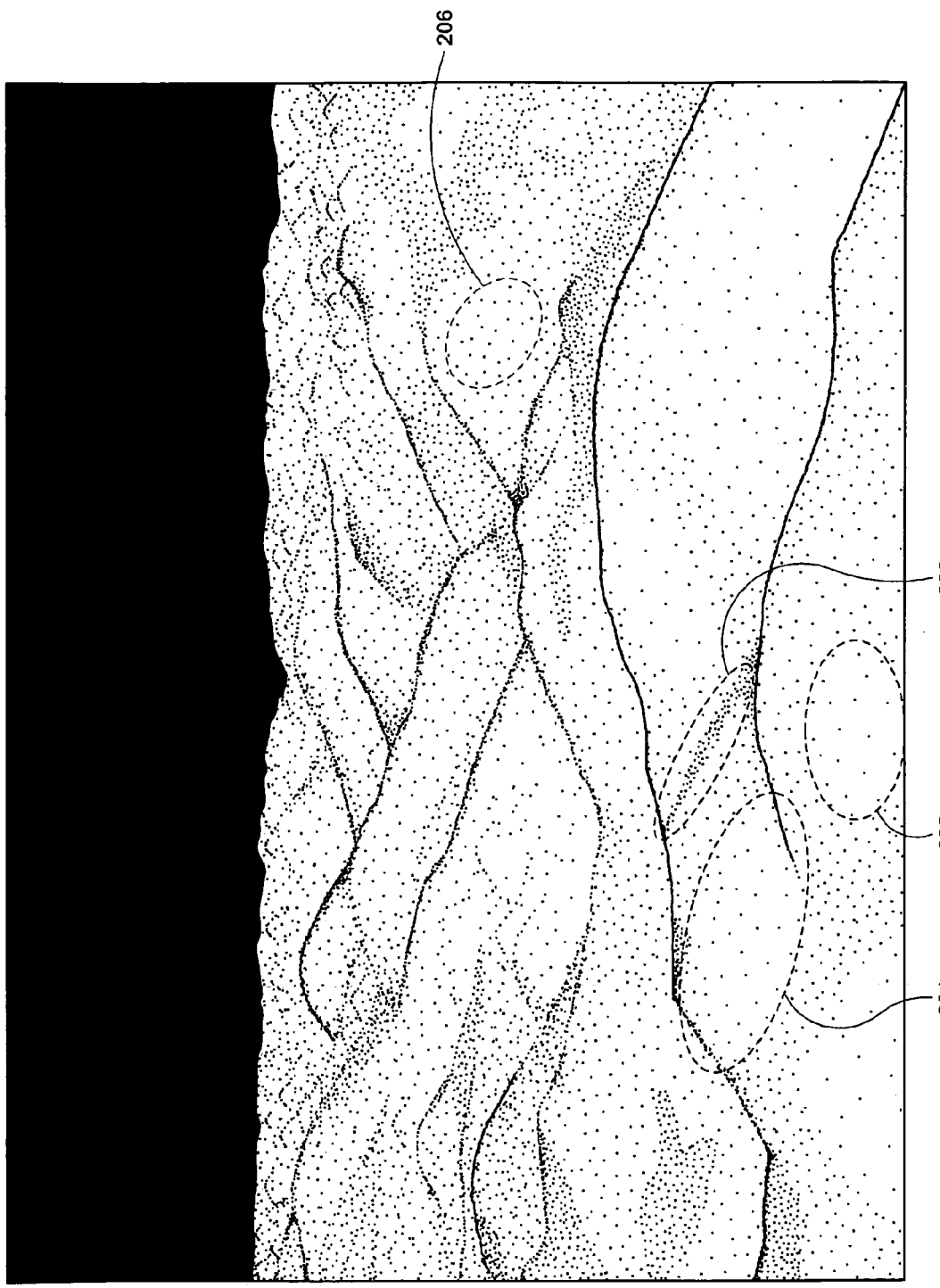
FIG. 3 depicts an example of a HUD unit presenting a lighted solid terrain image formed as a function of one or more intensities of a single color.

FIG. 3 provides an example of a depiction of a HUD Unit 140 presenting a lighted solid terrain image formed as a function of one or more intensities of a single color as embodied herein. FIG. 3 is intended to provide an illustration of the embodiments disclosed herein and should not be construed as a limitation. It should be noted that the darker areas of the images depicted in FIGS. 3, 5, 6, and 7 correlate to the greater transparency of the HUD display; for example, the dark area above the terrain is indicative of a wholly transparent HUD display allowing a pilot to see through the transparent display and view the scene in front of the aircraft. FIG. 3 depicts a terrain model that may be generated by an IG processor 150 based upon terrain data. In this model, an IG processor 150 could be also configured to generate color intensity data comprising of a plurality of color intensities representative of one or more shading effects.

One example of a shading effect embodied herein could be the positioning of a light source. In FIG. 3, a light source has been configured as originating from behind the aircraft. For the purpose of illustration only, the image shown in FIG. 3 is depicted as four shades with identifiable boundaries; in practice, more shades are typically available with unidentifiable boundaries. As a result, the faces of the mountainous terrain that have the steepest increase in elevation (i.e., greatest rate of change in elevation per a given horizontal distance) such as the terrain of item 202 may be depicted with the lightest shade of a color; likewise, the faces which level off at a top such as shown as item 208 (as well as the other ridgelines depicted in FIG. 3) may be depicted with the darkest shade of the color. In between these extremes, other shades of the Color may correspond to additional rates of change of terrain as shown by items 204 and 206. As embodied herein, an IG processor 150 may be programmed to generate a plurality of color intensities corresponding to the shading effects determined as a function the location of a light source.

Another example of a shading effect embodied herein could be the angle of the light source. In the model of FIG. 3, the angle of the light source could have been configured to project a light originating from an angle that is high relative to the ground. Here, the light source could represent a sun positioned at a relatively low angle above the horizon as represented by the numerous shades which, in turn, enhance the clarity depicted of the terrain comprising of mountainous slopes. As embodied herein, an IG processor 150 may be programmed to generate a plurality of color intensities corresponding to the shading effects determined as a function of the angle of the light source.

Another example of a shading effect embodied herein could be distance falloff. In the model depicted in FIG. 3, distance falloff could be configured to gradually generate darker shades as the distance from a light source becomes greater. As seen in FIG. 3, the shading gradually increases in darkness between the position of the aircraft and the horizon. That is, the lower portion of the image (and closest terrain in the scene) is generally lighter than the upper portion (and the farthest terrain). As embodied herein, an IG processor 150 may be programmed to generate a plurality of color intensities corresponding to the shading effects determined as a function of distance falloff.

Color intensity data could include data representative of one or more texturing effects. One example of a texturing effect embodied herein could be a pattern comprising a regular geometric arrangement of shapes. In an embodiment of FIG. 4, one such arrangement of shapes includes a checkerboard pattern that has been distorted to "fit" the contours of the same terrain model of FIG. 3. In addition, the texturing effects of the checkerboard pattern have been applied along with the shading effects that produced the image of FIG. 3. It should be noted that, for the purposes of illustration only, the shades of the image depicted in FIG. 3 have been inverted in FIG. 4.

Figure 5:
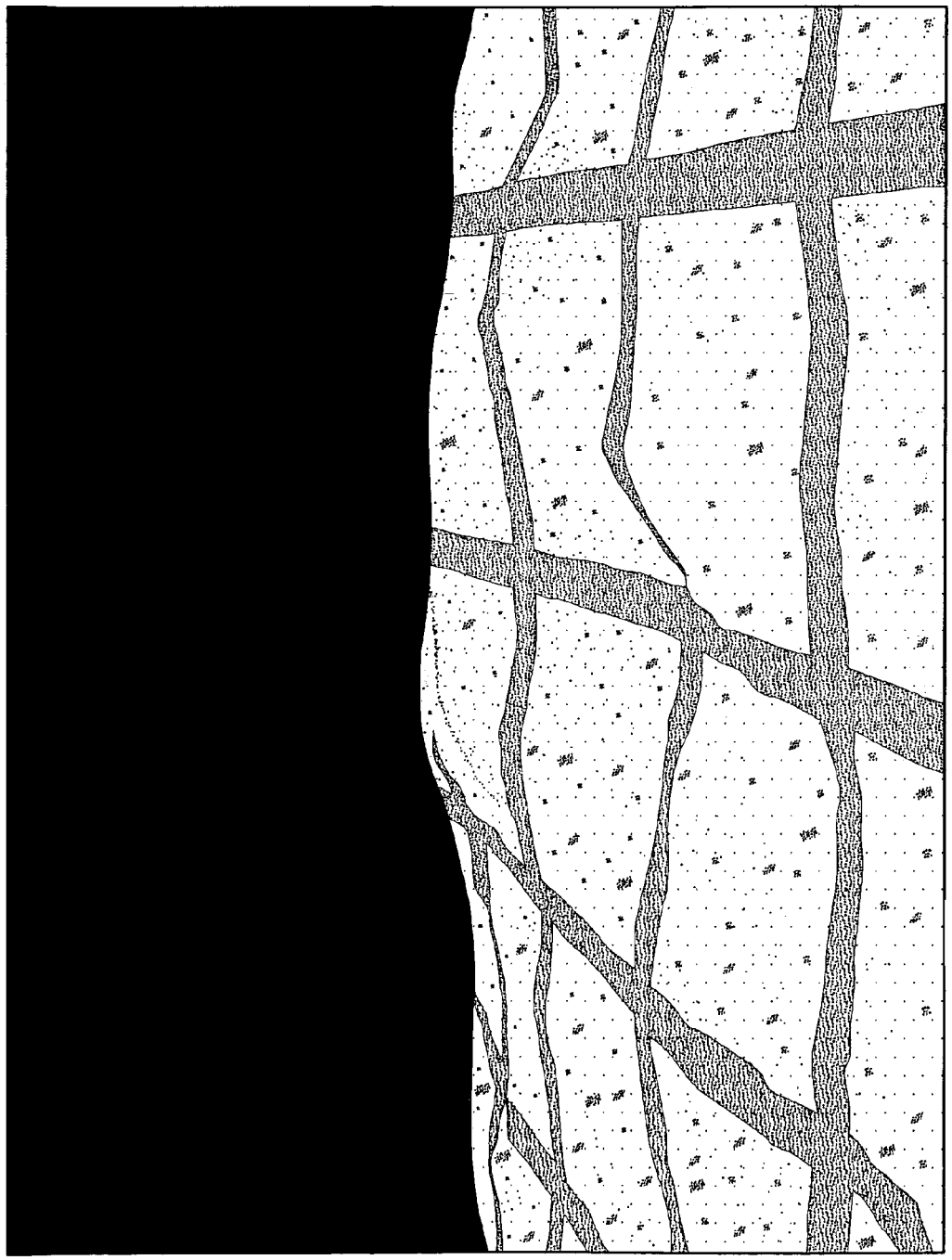
FIG. 5 depicts an example of a texturing effect of a second pattern comprising a regular geometric arrangement of shapes.

In simulator testing, a pattern comprising a regular geometric arrangement of shapes such as a checkerboard pattern or a fishnet pattern of FIG. 5 was found beneficial and advantageous, for such pattern provides sense of motion, distance to terrain, and height above terrain cues to the pilot. While a checkerboard pattern may be a common type of such arrangement, the embodiments are not limited a regular geometric arrangement of shapes having two alternating color intensities.

Another texturing effect of a pattern comprising a regular geometric arrangement could be an arrangement formed as a hollow grid of one color intensity. In an embodiment of FIG. 5, the texturing effects of a fishnet pattern have been distorted to "fit" the contours of the same terrain model of FIG. 3. As embodied herein, an IG processor 150 may be programmed to generate a plurality of color intensities corresponding to the texturing effects determined as a function a regular geometric arrangement of shapes.

In another embodiment of FIG. 5, texturing effects could include the seemingly random application of specks of various shapes and sizes. In simulator testing, the addition of specks to a fishnet pattern was found beneficial and advantageous, where the specks provided beneficial cues to the pilot at low altitudes, the fishnet pattern at high altitudes, and a combination of both during a transition between low and high altitudes. As embodied herein, an IG processor 150 may be programmed to generate a plurality of color intensities corresponding to the texturing effects determined as a function speckling or a random application of specks.

As embodied herein, the shape comprising a regular geometric arrangement of shapes is not limited to squares but may be any polygon suited for comprising an arrangement. Moreover, the shapes forming a regular geometric arrangement are not limited to closed shapes. For example, a pattern could be represented by solid or hollow polka-dots.

Another texturing effect could include an irregular arrangement of shapes and/or styles. For the purposes of illustration and not of limitation, texturing effects could include an irregular arrangement of shapes and/or styles such as a leopard skin or zebra stripes. As embodied herein, an IG processor 150 may be programmed to generate a plurality of color intensities corresponding to the texturing effects determined as a function of an irregular arrangement of shapes and/or styles.

Figure 4:
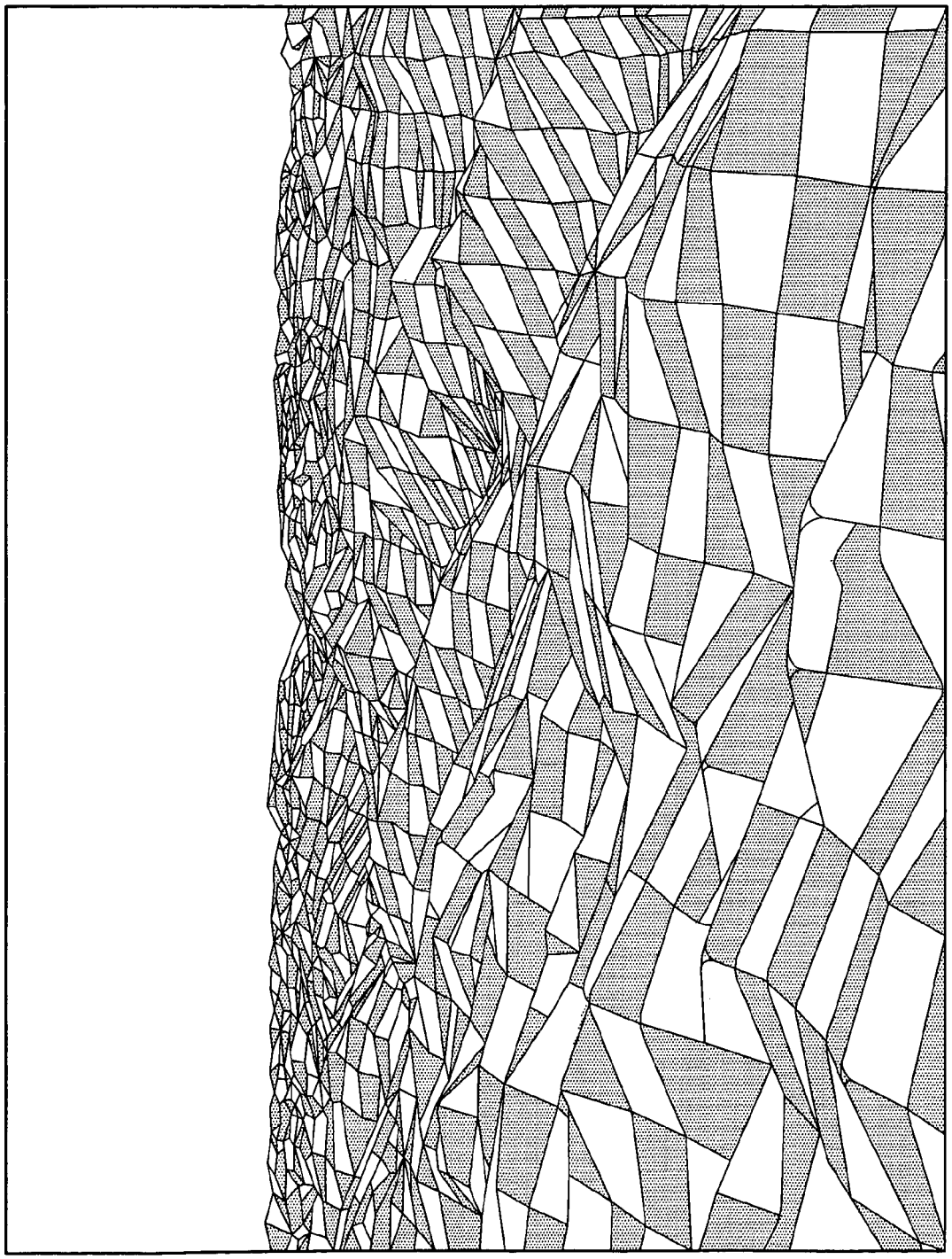
FIG. 4 depicts an example of a texturing effect of a pattern comprising a regular geometric arrangement of shapes.
Figure 6:
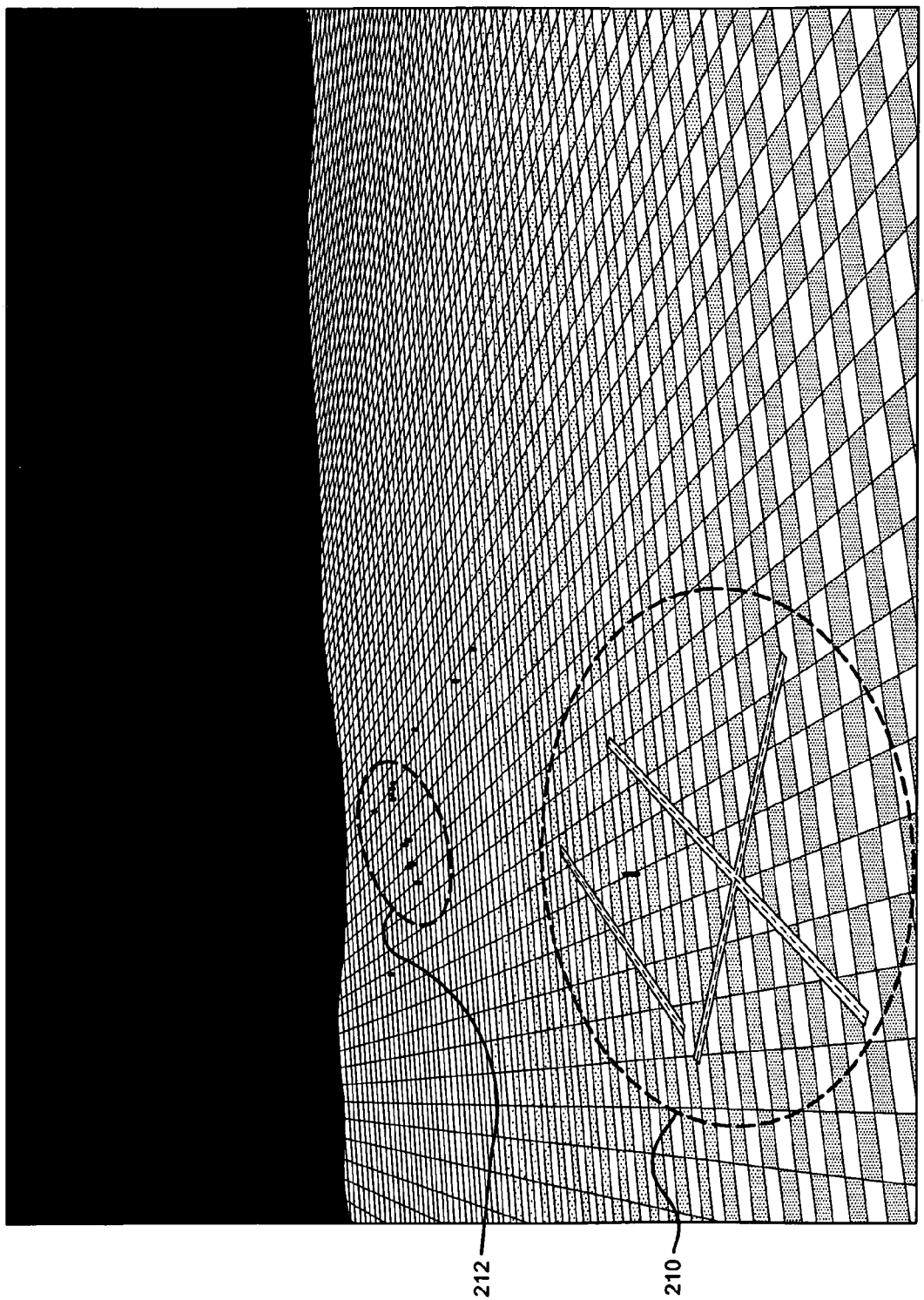
FIG. 6 depicts an example of a lighted solid terrain image without the use of shading effects.
Figure 7:
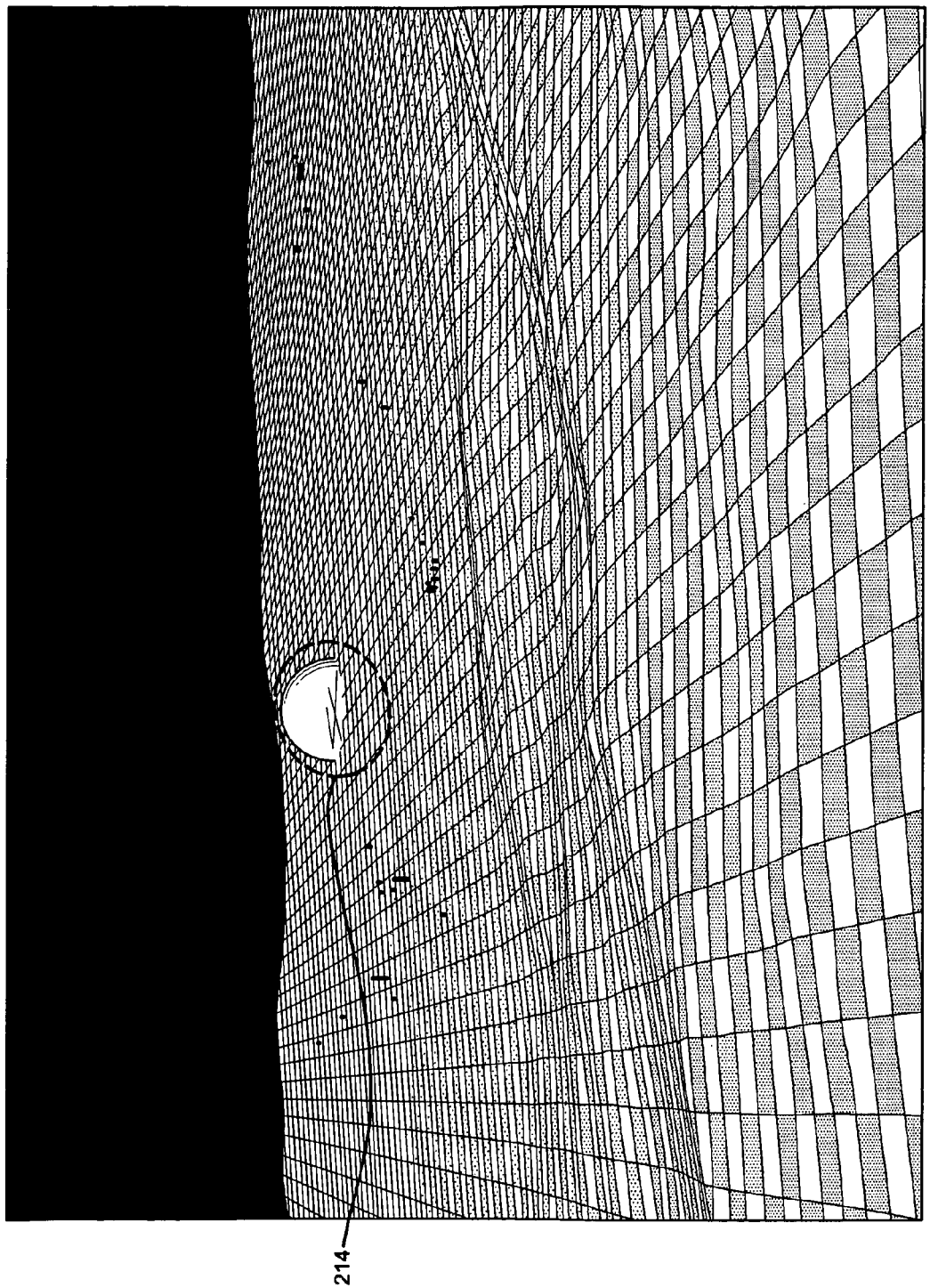
FIG. 7 depicts an example of a lighted solid terrain image with at least one location highlighter.

In the embodiments of FIGS. 3, 4, and 5, color intensity data included both texture effects and shading effects. As embodied herein, shading effects does not need to be programmed by a manufacturer or end-user. In the embodiments of FIGS. 6 and 7, examples of a lighted solid terrain image without the use of shading effects are presented on a HUD Unit 140. In both figures, the texturing effect of a checkerboard pattern that represents a pattern of regular geometric arrangement of shapes is employed. As observed, a three-dimensional perspective of the scene outside the aircraft may be depicted through the distortions of the shapes that comprise the arrangement. Additionally, the three-dimensional perspective may be depicted by decreasing the size of the shapes as the distance between the aircraft and terrain becomes greater.

In another embodiment of FIG. 6, objects are depicted using color intensities of a single color to produce a contrast between the objects and terrain. Objects that could be depicted include, but are not limited to, airports, navigation facilities, and designated airspace, information which may be provided by a location data source 130. For example, an airport is depicted as item 210. Terrain and obstacles (buildings, towers, smoke stacks, antennas, etc. . . . ) could also be depicted. For example, a cluster of obstacles are depicted as item 212. As observed, a light shade may depict the objects. As embodied herein, objects may be depicted in any shade, but a manufacturer or end-user may configure the presentation of each to contrast the shadings of terrain so not to blend with the terrain. As embodied herein, an IG processor 150 may be programmed to generate one or more color intensities corresponding to objects.

In an embodiment of FIG. 7, an example of a lighted solid terrain image with at least one location highlighter is depicted on a HUD Unit 140. The use of location highlighters for enhancing an image is disclosed in U.S. Pat. No. 8,094,188 which was incorporated by reference in its entirety as stated above. In FIG. 7, item 214 illustrates a location highlighter for enhancing the location of a distant airport. In this instance, a three-dimensional dome illuminates the location of airport. In this example, the use of a location highlighter 214 enhances a pilot's ability to determine the location of airport on a HUD Unit 140 by making the location of the object conspicuous against surrounding environment (i.e., terrain). As embodied herein, an IG processor 150 may be programmed to generate one or more color intensities associated with one or more location highlighters.

Figure 8:
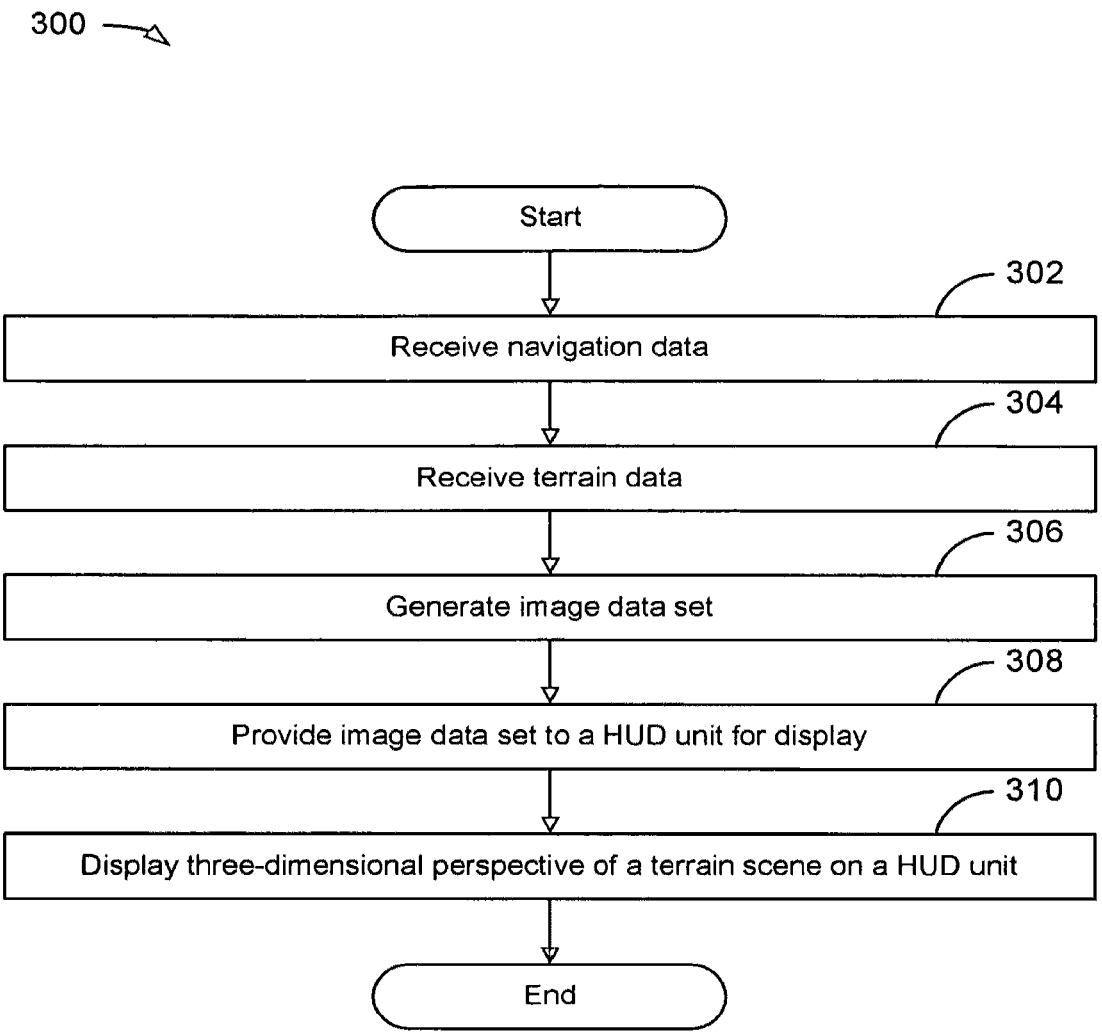
FIG. 8 provides a flowchart illustrating a method for presenting a three-dimensional perspective terrain on an aircraft display unit.

FIG. 8 depicts a flowchart 300 of an example of a method for presenting a three-dimensional perspective terrain on an aircraft display unit. The flowchart begins with module 302 with the receiving of navigation data by an IG processor 150 including data representative of the aircraft position in flight and attitude. The navigation data could be provided by a navigation system 110 to an IG processor 150, and position could comprise of geographic position (e.g., latitude and longitude coordinates) and altitude. As embodied herein, the receiving of data by a processor or the providing of data to a processor may include a step in which the processor performs a retrieval operation of such data. As embodied herein, a change in aircraft position could be used to determine the heading or direction of the scene outside the aircraft.

The flowchart continues with module 304 with the receiving of terrain data. Terrain data may be received from a terrain data source 120. In one embodiment, terrain data of the scene outside the aircraft could be provided by a terrain database. In another embodiment, terrain data could be provided by other aircraft systems or components thereof including, but not limited to, an SVS, an EVS, and a TAWS.

The flowchart continues to module 306 with the generation of an image data set by an IG processor 150. An image data set could represent a lighted solid image of terrain that is depicted in one color, where changes in terrain elevation or terrain contours may be demonstrated with different color intensities of the same color. An IG processor may determine or define an image data set as a function of terrain data and color intensity data. As embodied herein, such color intensity data may be configurable by a manufacturer or end-user and may include, but are not limited to, data relating to shading effects and texturing effects.

The flowchart continues to module 308 with the providing of an image data set to a HUD unit. The flowchart continues to module 310 with the displaying on the unit an image based upon the image data set. Such image data set is representative of a three-dimensional perspective of the terrain scene outside the aircraft comprising terrain. Then, the flowchart proceeds to the end.

In an alternative embodiment of FIG. 8, flowchart 300 may also comprise of the receiving of location data. Data representative of the location of one or more objects located in the scene outside the aircraft may be received from a location data source 130. Location data could be used by an IG processor 150 to determine highlighter data associated with each object. In one embodiment, a location data source could comprise an airport database. In another embodiment, a location data source could comprise a navigation database. In another embodiment, a location data source could comprise an airspace database. In another embodiment, a location data source could comprise other aircraft systems including, but not limited to, a flight management system and an AAWS.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting a monochrome image of terrain on a head-up display unit, such system comprising:
   a source for providing navigation data;
   a source for providing terrain data;
   an image generating processor configured to
      receive navigation data corresponding to aircraft position and orientation;
      receive terrain data from a database, where
         the terrain data corresponds to the navigation data;
      generate an image data set as a function of the terrain data and color intensity data, where
         the image data set is representative of a non-wireframe, single color perspective of the terrain scene outside the aircraft, where
            the perspective has the visual appearance of a three-dimensional, lighted solid terrain image formed by varying the brightness of the single color, and
            the color intensity data is comprised of shading effect data, such that
               changes in terrain elevation or terrain contours are indicated by varied brightnesses of the single color, whereby
                  darker and lighter areas of the three-dimensional, lighted solid terrain image comprised of the varied brightnesses correlate to greater and lesser transparencies of a head-up display unit, respectively; and
      provide the image data set to the head-up display unit; and
   the head-up display unit configured to
      receive the image data set, and
      display the perspective represented in the image data set.

2. The system of claim 1, wherein
   the color intensity data is further comprised of texturing effect data for the visual display of a consistent pattern of a two-dimensional, geometric arrangement of shapes comprised of a checkerboard pattern, a fishnet pattern, or a combination of both, where
      at least one predetermined brightness of the single color is used as shape fill to visually distinguish contiguous shapes, and
      the consistent pattern of a two-dimensional, geometric arrangement of shapes is
         depicted with clear boundaries over the entire terrain scene,
         applied to the entire terrain scene represented in the single color perspective, and
         fitted to the contours of the entire terrain.

3. The system of claim 1, wherein the color intensity data is further comprised of texturing effect data for the visual display of specks.

4. The system of claim 3, wherein the visual display of a consistent pattern of a two-dimensional, geometric arrangement of shapes and the specks is altitude-dependent.

5. The system of claim 1, further comprising:
   a source for providing location data, and
   the image generating processor is further configured to
      receive location data corresponding to the navigation data and representative of a fixed location of at least one object located in the scene outside the aircraft, where the fixed location has been predefined prior to flight; and
      include the location data in the generation of the image data set, such that
         the image data set is also representative of each object enhanced with a location highlighter against the background of the single color perspective, where generation of the image data set includes a function of the terrain data and location highlighter data associated with the location data, and
         the location highlighter data is determined as a function of the type of each object and is comprised of data representative of enhancing effects, whereby
            at least one location highlighter appears superimposed against the single color perspective, where the location of each object is highlighted as a three-dimensional location highlighter corresponding to the type of the object and comprised of at least one configurable enhancing effect.

6. The system of claim 5, wherein the source for providing location data is comprised of an airport database, an airspace database, a navigation database, an aircraft system, or a combination thereof.

7. An apparatus for presenting a monochrome image of terrain on a head-up display unit, such apparatus comprising:
   an input communications interface configured to facilitate the receiving of navigation and terrain data by an image generating processor;
   the image generating processor configured to
      receive navigation data corresponding to aircraft position and orientation;
      receive terrain data from a database, where
         the terrain data corresponds to the navigation data;
      generate an image data set as a function of the terrain data and color intensity data, where
         the image data set is representative of a non-wireframe, single color perspective of the terrain scene outside the aircraft, where
            the perspective has the visual appearance of a three-dimensional, lighted solid terrain image formed by varying the brightness of the single color, and
            the color intensity data is comprised of shading effect data, such that changes in terrain elevation or terrain contours are indicated by varied brightnesses of the single color, whereby
darker and lighter areas of the three-dimensional, lighted solid terrain image comprised of the varied brightnesses correlate to greater and lesser transparencies of a head-up display unit, respectively; and
provide the image data set to an output communications interface; and
the output communications interface configured to facilitate the providing of the image data set to the head-up display unit.

8. The apparatus of claim 7, wherein the color intensity data is further comprised of texturing effect data for the visual display of specks.

9. The apparatus of claim 8, wherein the visual display of a consistent pattern of a two-dimensional, geometric arrangement of shapes and the specks is altitude-dependent.

10. The apparatus of claim 7, wherein
the color intensity data is further comprised of texturing effect data for the visual display of a consistent pattern of a two-dimensional, geometric arrangement of shapes comprised of a checkerboard pattern, a fishnet pattern, or a combination of both, where
at least one predetermined brightness of the single color is used as shape fill to visually distinguish contiguous shapes, and
the consistent pattern of a two-dimensional, geometric arrangement of shapes is
depicted with clear boundaries over the entire terrain scene,
applied to the entire terrain scene represented in the single color perspective, and
fitted to the contours of the entire terrain.

11. The apparatus of claim 7, wherein
the input communications interface is further configured to facilitate the receiving of location data by the image generating processor; and
the image generating processor is further configured to
receive location data corresponding to the navigation data and representative of a fixed location of at least one object located in the scene outside the aircraft, where the fixed location has been predefined prior to flight; and
include the location data in the generation of the image data set, such that
the image data set is also representative of each object enhanced with a location highlighter against the background of the single color perspective, where
generation of the image data set includes a function of the terrain data and location highlighter data associated with the location data, and
the location highlighter data is determined as a function of the type of each object and is comprised of data representative of enhancing effects, whereby
at least one location highlighter appears superimposed against the single color perspective, where the location of each object is highlighted as a three-dimensional location highlighter corresponding to the type of the object and comprised of at least one configurable enhancing effect.

12. A method for presenting a monochrome image of terrain on a head-up display unit, such method comprising:
receiving navigation data corresponding to aircraft position and orientation;
receiving terrain data from a database, where
the terrain data corresponds to the navigation data;
generating an image data set as a function of the terrain data and color intensity data, where
the image data set is representative of a non-wireframe, single color perspective of the terrain scene outside the aircraft, where
the perspective has the visual appearance of a three-dimensional, lighted solid terrain image formed by varying the brightness of the single color, and
the color intensity data is comprised of shading effect data, such that
changes in terrain elevation or terrain contours are indicated by varied brightnesses of the single color, whereby
darker and lighter areas of the three-dimensional, lighted solid terrain image comprised of the varied brightnesses correlate to greater and lesser transparencies of a head-up display unit, respectively; and
providing the image data set to the head-up display unit, whereby
the perspective represented in the image data set is displayed.

13. The method of claim 12, wherein the color intensity data is further comprised of texturing effect data for the visual display of specks.

14. The method of claim 13, wherein the visual display of a consistent pattern of a two-dimensional, geometric arrangement of shapes and the specks is altitude-dependent.

15. The method of claim 12, wherein
the color intensity data is further comprised of texturing effect data for the visual display of a consistent pattern of a two-dimensional, geometric arrangement of shapes comprised of a checkerboard pattern, a fishnet pattern, or a combination of both, where
at least one predetermined brightness of the single color is used as shape fill to visually distinguish contiguous shapes, and
the consistent pattern of a two-dimensional, geometric arrangement of shapes is
depicted with clear boundaries over the entire terrain scene,
applied to the entire terrain scene represented in the single color perspective, and
fitted to the contours of the entire terrain.

16. The method of claim 15, further comprising:
receiving location data corresponding to the navigation data and representative of a fixed location of at least one object located in the scene outside the aircraft, where the fixed location has been predefined prior to flight; and
including the location data in the generation of the image data set, such that the image data set is also representative of each object enhanced with a location highlighter against the background of the single color perspective, where generation of the image data set includes a function of the terrain data and location highlighter data associated with the location data, and the location highlighter data is determined as a function of the type of each object and is comprised of data representative of enhancing effects, whereby
at least one location highlighter appears superimposed against the single color perspective, where the location of each object is highlighted as a three-dimensional location highlighter corresponding to the type of the object and comprised of at least one configurable enhancing effect.

* * * * *